US010753210B2

(12) United States Patent
Jennings et al.

(10) Patent No.: US 10,753,210 B2
(45) Date of Patent: Aug. 25, 2020

(54) AIRFOIL HAVING IMPROVED COOLING SCHEME

(71) Applicant: United Technologies Corporation, Farmington, CT (US)

(72) Inventors: Timothy J. Jennings, West Hartford, CT (US); Tracy A. Propheter-Hinckley, Rocky Hill, CT (US); Kyle C. Lana, Portland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 147 days.

(21) Appl. No.: 15/968,865

(22) Filed: May 2, 2018

(65) Prior Publication Data
US 2019/0338652 A1 Nov. 7, 2019

(51) Int. Cl.
F01D 5/18 (2006.01)
F01D 5/14 (2006.01)

(52) U.S. Cl.
CPC ............ F01D 5/189 (2013.01); F01D 5/147 (2013.01); F01D 5/18 (2013.01); F01D 5/186 (2013.01);
(Continued)

(58) Field of Classification Search
CPC . F01D 5/189; F01D 5/186; F01D 5/18; F01D 5/147; F01D 9/065; F05D 2260/202; F05D 2220/323; F05D 2230/211
See application file for complete search history.

(56) References Cited

U.S. PATENT DOCUMENTS 2,879,028 A * 3/1959 Stalker .................... F01D 5/183
416/90 R
2,920,865 A * 1/1960 Lombard .................. B64C 1/40
416/97 R
(Continued)

FOREIGN PATENT DOCUMENTS

EP 2193859 A1 * 6/2010 ............. F01D 5/187
EP 2628901 A1 * 8/2013 ............. F01D 5/189
(Continued)

OTHER PUBLICATIONS

European Search Report for European Application No. 19171050.8, International Filing Date Apr. 25, 2019, dated Aug. 2, 2019, 8 pages.

Primary Examiner — Woody A Lee, Jr.
Assistant Examiner — Brian Christopher Delrue
(74) Attorney, Agent, or Firm — Cantor Colburn LLP

(57) ABSTRACT

Airfoils for gas turbine engines are provided. The airfoils include an airfoil body extending between leading and trailing edges in an axial direction, between pressure and suction sides in a circumferential direction, and between a root and tip in a radial direction, a first shielding sidewall cavity located adjacent one of the pressure and suction sides proximate the root of the airfoil body and extending radially toward the tip, a second shielding sidewall cavity located adjacent the other of the pressure and suction sides proximate the root of the airfoil body and extending radially toward the tip, and a shielded sidewall cavity located between the first shielding sidewall cavity and the second shielding sidewall cavity, wherein the shielded sidewall cavity is not adjacent either of the pressure or suction sides proximate the root and transitions to be proximate at least one of the pressure and suction sides proximate the tip.

20 Claims, 7 Drawing Sheets

US 10,753,210 B2
Page 2

(52) U.S. Cl.
CPC .. *F05D 2220/323* (2013.01); *F05D 2260/202* (2013.01)

(56) References Cited

U.S. PATENT DOCUMENTS

| | | | | |
|---|---|---|---|---|
| 3,017,159 A * | 1/1962 | Foster | F01D 5/147 | 416/90 R |
| 3,191,908 A * | 6/1965 | Petrie | F01D 5/187 | 416/96 R |
| 3,275,294 A * | 9/1966 | Allen | F01D 9/041 | 415/115 |
| 3,540,810 A * | 11/1970 | Kercher | F01D 5/189 | 416/90 R |
| 3,574,481 A * | 4/1971 | Pyne, Jr. | F01D 5/189 | 416/90 R |
| 3,736,071 A * | 5/1973 | Kydd | F01D 5/185 | 416/97 R |
| 3,844,678 A * | 10/1974 | Sterman | F01D 5/182 | 416/97 R |
| 3,856,433 A * | 12/1974 | Grondahl | F01D 5/081 | 416/97 R |
| 4,017,210 A * | 4/1977 | Darrow | F01D 5/185 | 416/97 R |
| 4,111,604 A * | 9/1978 | Kydd | F01D 5/185 | 416/92 |
| 4,153,386 A * | 5/1979 | Leogrande | F01D 5/188 | 415/115 |
| 4,218,178 A * | 8/1980 | Irwin | F01D 5/185 | 415/114 |
| 4,236,870 A * | 12/1980 | Hucul, Jr. | F01D 5/187 | 415/115 |
| 4,297,077 A * | 10/1981 | Durgin | F01D 5/189 | 416/97 R |
| 4,314,442 A * | 2/1982 | Rice | F01D 5/185 | 415/114 |
| 4,487,550 A * | 12/1984 | Horvath | F01D 5/20 | 416/92 |
| 4,500,258 A * | 2/1985 | Dodd | F01D 5/187 | 416/96 R |
| 4,684,322 A * | 8/1987 | Clifford | F01D 5/187 | 415/175 |
| 4,770,608 A * | 9/1988 | Anderson | F01D 5/186 | 415/115 |
| 5,012,853 A * | 5/1991 | Bihlmaier | B22D 19/00 | 164/132 |
| 5,215,431 A * | 6/1993 | Derrien | F01D 5/187 | 415/115 |
| 5,243,759 A * | 9/1993 | Brown | B22C 9/10 | 164/122.1 |
| 5,342,172 A * | 8/1994 | Coudray | F01D 5/186 | 416/95 |
| 5,378,108 A * | 1/1995 | Zelesky | F01D 5/187 | 415/115 |
| 5,387,085 A * | 2/1995 | Thomas, Jr. | F01D 5/187 | 415/115 |
| 5,392,515 A * | 2/1995 | Auxier | B23P 15/04 | 29/463 |
| 5,484,258 A * | 1/1996 | Isburgh | F01D 5/187 | 415/115 |
| 5,603,606 A * | 2/1997 | Glezer | F01D 5/187 | 415/115 |
| 5,660,524 A * | 8/1997 | Lee | F01D 5/182 | 415/115 |
| 5,702,232 A * | 12/1997 | Moore | F01D 5/186 | 416/95 |
| 5,813,836 A * | 9/1998 | Starkweather | F01D 5/187 | 415/173.4 |
| 5,820,337 A * | 10/1998 | Jackson | C22C 32/00 | 415/200 |
| 6,126,397 A * | 10/2000 | Kvasnak | F01D 5/186 | 415/115 |
| 6,174,135 B1 * | 1/2001 | Lee | F01D 5/18 | 416/97 R |
| 6,206,638 B1 * | 3/2001 | Glynn | F01D 5/186 | 415/115 |
| 6,254,334 B1 * | 7/2001 | LaFleur | F01D 5/186 | 415/115 |
| 6,287,075 B1 * | 9/2001 | Kercher | F01D 5/186 | 415/115 |
| 6,290,463 B1 * | 9/2001 | Fargher | F01D 5/187 | 415/115 |
| 6,305,903 B1 * | 10/2001 | Semmler | F01D 5/187 | 416/97 R |
| 6,328,531 B1 * | 12/2001 | Bariaud | F01D 5/141 | 416/97 R |
| 6,551,062 B2 * | 4/2003 | Leeke | F01D 5/186 | 415/115 |
| 6,558,122 B1 * | 5/2003 | Xu | F01D 5/141 | 416/223 A |
| 6,773,230 B2 * | 8/2004 | Bather | F01D 5/186 | 415/115 |
| 6,974,308 B2 * | 12/2005 | Halfmann | B22C 9/04 | 415/115 |
| 6,981,840 B2 * | 1/2006 | Lee | F01D 5/187 | 415/115 |
| 6,984,103 B2 * | 1/2006 | Lee | F01D 5/187 | 415/115 |
| 7,104,757 B2 * | 9/2006 | Gross | F01D 5/187 | 415/115 |
| 7,118,326 B2 * | 10/2006 | Liang | F01D 5/189 | 415/115 |
| 7,156,619 B2 * | 1/2007 | Papple | F01D 5/187 | 415/115 |
| 7,293,961 B2 * | 11/2007 | Lee | F01D 5/187 | 415/115 |
| 7,303,376 B2 * | 12/2007 | Liang | F01D 5/187 | 416/233 |
| 7,334,991 B2 * | 2/2008 | Liang | F01D 5/081 | 416/97 R |
| 7,390,168 B2 * | 6/2008 | Liang | F01D 5/186 | 416/97 R |
| 7,448,433 B2 * | 11/2008 | Ortiz | B22C 7/00 | 164/516 |
| 7,556,476 B1 * | 7/2009 | Liang | F01D 5/188 | 415/115 |
| 7,690,894 B1 * | 4/2010 | Liang | F01D 5/186 | 415/115 |
| 7,762,775 B1 * | 7/2010 | Liang | F01D 5/187 | 416/97 R |
| 7,775,768 B2 | 8/2010 | Devore et al. | | |
| 7,780,413 B2 * | 8/2010 | Liang | F01D 5/188 | 416/97 R |
| 7,845,906 B2 * | 12/2010 | Spangler | F01D 5/186 | 416/97 R |
| 8,105,033 B2 * | 1/2012 | Hudson | F01D 5/187 | 416/97 R |
| 8,109,735 B2 * | 2/2012 | Gage | B23P 15/02 | 416/241 R |
| 8,113,780 B2 * | 2/2012 | Cherolis | B22C 7/02 | 416/97 R |
| 8,231,329 B2 * | 7/2012 | Benjamin | F01D 5/188 | 415/115 |
| 8,414,263 B1 | 4/2013 | Liang | | |
| 8,449,254 B2 | 5/2013 | Devore et al. | | |
| 8,511,994 B2 * | 8/2013 | Devore | F01D 5/187 | 416/97 R |
| 8,721,285 B2 * | 5/2014 | Liang | F01D 5/187 | 415/115 |
| 8,753,083 B2 * | 6/2014 | Lacy | F01D 5/186 | 415/115 |
| 8,985,940 B2 * | 3/2015 | Zhang | F01D 5/081 | 415/115 |
| 8,985,949 B2 * | 3/2015 | Lee | F01D 5/187 | 416/97 R |
| 9,017,025 B2 * | 4/2015 | Lee | F01D 5/187 | 416/97 R |
| 9,115,590 B2 | 8/2015 | Spangler et al. | | |
| 9,121,290 B2 * | 9/2015 | Jenne | F01D 5/187 | |

(56) References Cited

U.S. PATENT DOCUMENTS

| | | | |
|---|---|---|---|
| 9,296,039 B2* | 3/2016 | Propheter-Hinckley | B22C 9/10 |
| 9,422,817 B2 | 8/2016 | Beattie et al. | |
| 9,528,380 B2 | 12/2016 | Weber et al. | |
| 9,528,382 B2* | 12/2016 | Morgan | F01D 5/147 |
| 10,053,989 B2* | 8/2018 | Weber | F01D 5/18 |
| 2001/0012484 A1* | 8/2001 | Beeck | B22D 11/0405 |
| | | | 416/97 R |
| 2002/0187043 A1* | 12/2002 | Liang | F01D 5/186 |
| | | | 416/97 R |
| 2003/0133795 A1* | 7/2003 | Manning | F01D 5/187 |
| | | | 416/97 R |
| 2004/0076519 A1* | 4/2004 | Halfmann | B22C 9/04 |
| | | | 416/97 R |
| 2004/0115058 A1* | 6/2004 | Lagrange | F01D 5/142 |
| | | | 416/223 A |
| 2005/0006047 A1* | 1/2005 | Wang | B22C 9/10 |
| | | | 164/516 |
| 2005/0111977 A1* | 5/2005 | Lee | F01D 5/187 |
| | | | 416/97 R |
| 2006/0107668 A1* | 5/2006 | Cunha | F01D 5/18 |
| | | | 60/806 |
| 2007/0104576 A1* | 5/2007 | Cunha | B22C 9/04 |
| | | | 416/97 R |
| 2007/0116569 A1* | 5/2007 | Cunha | B22C 9/06 |
| | | | 416/97 R |
| 2007/0201980 A1* | 8/2007 | Morris | B22C 9/04 |
| | | | 416/97 R |
| 2007/0286735 A1* | 12/2007 | Cunha | F01D 5/187 |
| | | | 416/97 R |
| 2008/0028606 A1* | 2/2008 | Krishnakumar | B22C 9/043 |
| | | | 29/889.2 |
| 2008/0145234 A1* | 6/2008 | Lee | B22C 9/103 |
| | | | 416/96 R |
| 2009/0185903 A1* | 7/2009 | Beeck | F01D 5/145 |
| | | | 416/91 |
| 2009/0238695 A1* | 9/2009 | Devore | F01D 5/187 |
| | | | 416/97 R |
| 2011/0123311 A1* | 5/2011 | Devore | F01D 5/187 |
| | | | 415/115 |
| 2011/0274559 A1* | 11/2011 | Jenne | F01D 5/187 |
| | | | 416/97 R |
| 2013/0017064 A1* | 1/2013 | Naik | F01D 5/187 |
| | | | 415/115 |
| 2013/0156599 A1* | 6/2013 | Ahmad | F01D 5/187 |
| | | | 416/96 R |
| 2013/0216395 A1* | 8/2013 | Bregman | F01D 5/187 |
| | | | 416/97 R |
| 2013/0280091 A1* | 10/2013 | Propheter-Hinckley | B22C 9/10 |
| | | | 416/97 A |
| 2014/0112799 A1* | 4/2014 | Lee | F01D 5/187 |
| | | | 416/97 R |
| 2016/0010465 A1 | 1/2016 | Slavens et al. | |
| 2016/0186664 A1* | 6/2016 | Kirtley | F02C 7/28 |
| | | | 415/115 |
| 2017/0002662 A1 | 1/2017 | Waite et al. | |
| 2017/0022817 A1* | 1/2017 | Alpan | F01D 5/082 |
| 2017/0175541 A1* | 6/2017 | Weber | F01D 5/187 |
| 2017/0191368 A1 | 7/2017 | Dujol et al. | |

FOREIGN PATENT DOCUMENTS

| | | | |
|---|---|---|---|
| EP | 3184740 A1 * | 6/2017 | F01D 5/186 |
| EP | 3184740 A1 | 6/2017 | |
| EP | 3184741 A1 | 6/2017 | |
| EP | 3346094 A1 * | 7/2018 | F01D 5/187 |
| EP | 3346094 A1 | 7/2018 | |
| FR | 3041989 A1 | 4/2017 | |
| FR | 3056631 A1 | 3/2018 | |
| WO | WO-2008133758 A2 * | 11/2008 | F01D 5/187 |

* cited by examiner

AIRFOIL HAVING IMPROVED COOLING SCHEME

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of airfoil bodies, improved cooling designs may be desirable.

BRIEF DESCRIPTION

According to some embodiments, airfoils for gas turbine engines are provided. The airfoils include an airfoil body extending between a leading edge and a trailing edge in an axial direction, between a pressure side and a suction side in a circumferential direction, and between a root and a tip in a radial direction, a first shielding sidewall cavity located adjacent one of the pressure side and the suction side proximate the root of the airfoil body and extending radially toward the tip, a second shielding sidewall cavity located adjacent the other of the pressure side and the suction side proximate the root of the airfoil body and extending radially toward the tip, and a shielded sidewall cavity located between the first shielding sidewall cavity and the second shielding sidewall cavity, wherein the shielded sidewall cavity is not adjacent either of the pressure side or the suction side proximate the root and transitions to be proximate at least one of the pressure side and the suction side proximate the tip.

In addition to one or more of the features described above, or as an alternative, further embodiments of the airfoils may include that the first shielding sidewall cavity is positioned along the pressure side and the second shielding sidewall cavity is positioned along the suction side of the airfoil body.

In addition to one or more of the features described above, or as an alternative, further embodiments of the airfoils may include that the second shielding sidewall cavity extends from the root to the tip of the airfoil body.

In addition to one or more of the features described above, or as an alternative, further embodiments of the airfoils may include that the first shielding sidewall cavity is a truncated cavity having a dead end.

In addition to one or more of the features described above, or as an alternative, further embodiments of the airfoils may include that the shielded sidewall cavity transitions toward the pressure or suction side radially outward from the dead end.

In addition to one or more of the features described above, or as an alternative, further embodiments of the airfoils may include that the first shielding sidewall cavity transitions aftward at a transition portion and extends from the root to the tip.

In addition to one or more of the features described above, or as an alternative, further embodiments of the airfoils may include that the shielded sidewall cavity transitions toward the pressure or suction side radially outward from the transition portion.

In addition to one or more of the features described above, or as an alternative, further embodiments of the airfoils may include one or more first film holes fluidly connecting the first shielding sidewall cavity to an exterior of the airfoil body and one or more second film holes fluidly connecting the shielded sidewall cavity to the exterior of the airfoil body.

In addition to one or more of the features described above, or as an alternative, further embodiments of the airfoils may include a main body cavity located aft of the first shielding sidewall cavity.

In addition to one or more of the features described above, or as an alternative, further embodiments of the airfoils may include that the first shielding sidewall cavity transitions to shield a portion of the main body cavity proximate the tip.

In addition to one or more of the features described above, or as an alternative, further embodiments of the airfoils may include a leading edge cavity forward of the first shielding sidewall cavity and proximate the leading edge of the airfoil body.

According to some embodiments, core assemblies for forming airfoils of gas turbine engines are provided. The core assemblies include a first sidewall cavity core arranged to form an internal cavity of a formed airfoil, the first sidewall cavity core positioned to be adjacent one of a suction side and a pressure side of the formed airfoil at a root of the formed airfoil, a second sidewall cavity core arranged to form an internal cavity of the formed airfoil, the second sidewall cavity core positioned to be adjacent the other of the suction side and the pressure side of the formed airfoil at the root of the formed airfoil, and a third sidewall cavity core arranged to form an internal cavity of the formed airfoil, the third sidewall cavity core positioned between the first sidewall cavity core and the second sidewall cavity core at a root of the formed airfoil and transitions to be proximate at least one of the pressure side and the suction side proximate a tip of the formed airfoil, wherein a shielded sidewall cavity is formed by the third sidewall cavity core in the formed airfoil.

In addition to one or more of the features described above, or as an alternative, further embodiments of the core assemblies may include that the first sidewall cavity core is positioned along the formed pressure side and the second sidewall cavity core is positioned along the formed suction side.

In addition to one or more of the features described above, or as an alternative, further embodiments of the core assemblies may include that the first sidewall cavity core is a truncated core having a core end located between a formed root and formed tip of the formed airfoil.

In addition to one or more of the features described above, or as an alternative, further embodiments of the core assemblies may include that the third sidewall cavity core transitions toward the formed pressure or suction side radially outward from the core end.

In addition to one or more of the features described above, or as an alternative, further embodiments of the core assemblies may include that the first sidewall cavity core transitions aftward along a transition portion and extends from the formed root to the formed tip of the formed airfoil.

In addition to one or more of the features described above, or as an alternative, further embodiments of the core assemblies may include a main body cavity core located aft of the first sidewall cavity core.

In addition to one or more of the features described above, or as an alternative, further embodiments of the core assemblies may include that the first sidewall cavity core transitions to shield a portion of the main body cavity core proximate the formed tip.

In addition to one or more of the features described above, or as an alternative, further embodiments of the core assemblies may include a leading edge cavity core forward of the first sidewall cavity core and proximate a leading edge of the formed airfoil.

According to some embodiments, gas turbine engines are provided. The gas turbine engines include a turbine section having a plurality of airfoils. At least one of the airfoils includes an airfoil body extending between a leading edge and a trailing edge in an axial direction, between a pressure side and a suction side in a circumferential direction, and between a root and a tip in a radial direction, a first shielding sidewall cavity located adjacent one of the pressure side and the suction side proximate the root of the airfoil body and extending radially toward the tip, a second shielding sidewall cavity located adjacent the other of the pressure side and the suction side proximate the root of the airfoil body and extending radially toward the tip, and a shielded sidewall cavity located between the first shielding sidewall cavity and the second shielding sidewall cavity, wherein the shielded sidewall cavity is not adjacent either of the pressure side or the suction side proximate the root and transitions to be proximate at least one of the pressure side and the suction side proximate the tip.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
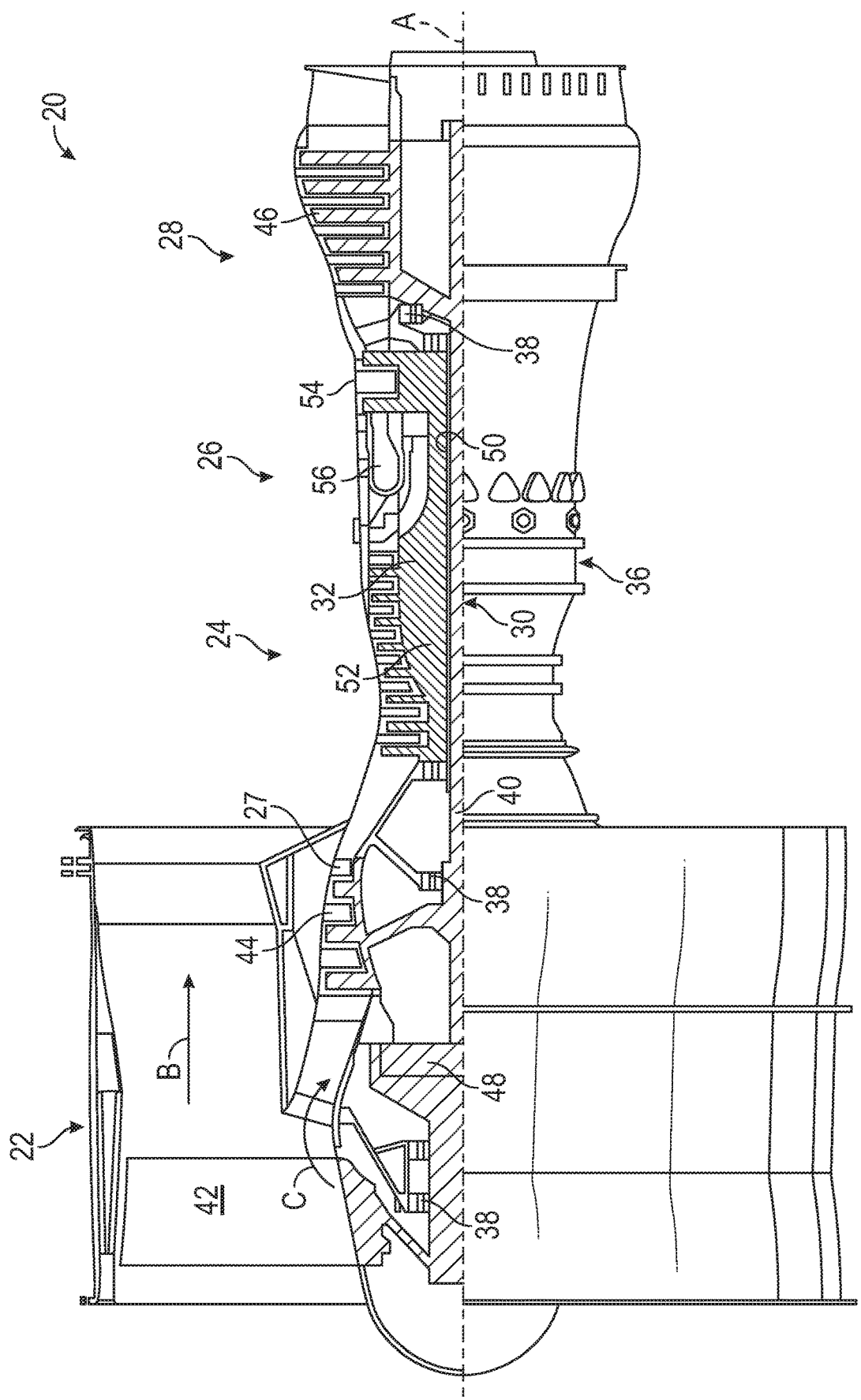
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 can be connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(514.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
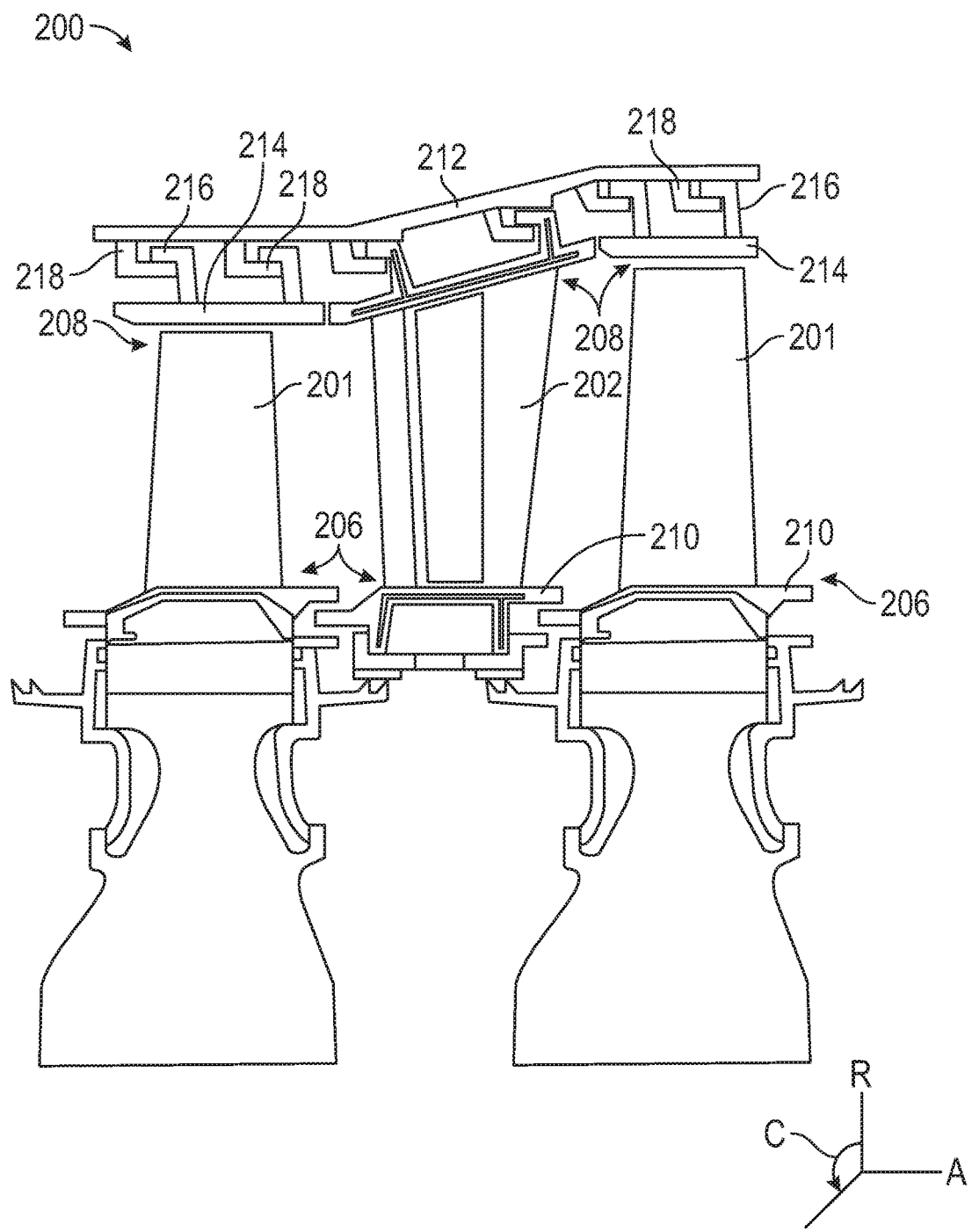
FIG. 2 is a schematic illustration of a portion of a turbine section of the gas turbine engine of FIG. 1.

FIG. 2 is a schematic view of a turbine section that may employ various embodiments disclosed herein. Turbine 200 includes a plurality of airfoils, including, for example, one or more blades 201 and vanes 202. The airfoils 201, 202 may be hollow bodies with internal cavities defining a number of channels or cavities, hereinafter airfoil cavities, formed therein and extending from an inner diameter 206 to an outer diameter 208, or vice-versa. The airfoil cavities may be separated by partitions or internal walls or structures within the airfoils 201, 202 that may extend either from the inner diameter 206 or the outer diameter 208 of the airfoil 201, 202, or as partial sections therebetween. The partitions may extend for a portion of the length of the airfoil 201, 202, but may stop or end prior to forming a complete wall within the airfoil 201, 202. Multiple of the airfoil cavities may be fluidly connected and form a fluid path within the respective airfoil 201, 202. The blades 201 and the vanes 202, as shown, are airfoils that extend from platforms 210 located proximal to the inner diameter thereof. Located below the platforms 210 may be airflow ports and/or bleed orifices that enable air to bleed from the internal cavities of the airfoils 201, 202. A root of the airfoil may connect to or be part of the platform 210. Such roots may enable connection to a turbine disc, as will be appreciated by those of skill in the art.

The turbine 200 is housed within a case 212, which may have multiple parts (e.g., turbine case, diffuser case, etc.). In various locations, components, such as seals, may be positioned between the airfoils 201, 202 and the case 212. For example, as shown in FIG. 2, blade outer air seals 214 (hereafter "BOAS") are located radially outward from the blades 201. As will be appreciated by those of skill in the art, the BOAS 214 can include BOAS supports that are configured to fixedly connect or attach the BOAS 214 to the case 212 (e.g., the BOAS supports can be located between the BOAS and the case). As shown in FIG. 2, the case 212 includes a plurality of hooks 218 that engage with the hooks 216 to secure the BOAS 214 between the case 212 and a tip of the blade 201.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

Typically, airfoil cooling includes impingement cavities for cooling various hot surfaces of the airfoils. For example, it may be desirable to position a leading edge impingement cavity immediately adjacent to the external leading edge of the airfoil (e.g., left side edge of the airfoils 201, 202). The leading edge impingement cavity is typically supplied cooling airflow from impingement apertures which serve as conduits for cooling air that originates within the leading edge cooling cavities of the airfoil. Once in the leading edge impingement cavity, the cooling air flow is expelled through an array of shower head holes, thus providing increased convective cooling and a protective film to mitigate the locally high external heat flux along the leading edge airfoil surface.

Traditionally, investment casting manufacturing processes utilize hard tooling "core dies" to create both external airfoil and internal cooling geometries. In order to fabricate internal cooling geometries, it is required that the definition of the features be created in the same relative orientation (approximately parallel) to the "pull" direction of the core die tooling. As a result, the orientation and location of any internal cooling features is limited by virtue of core tooling/core die manufacturing processes used for investment casting of turbine airfoils. Further, various cooling feature may require drilling through the external walls or surfaces of the airfoil to fluidly connect to internal cavities thereof (e.g., to form film cooling holes). The orientation of the local internal rib geometry and positioning of the impingement cooling apertures is necessary to ensure optimal internal convective heat transfer characteristics are achieved to mitigate high external heat flux regions.

Figure 3A:
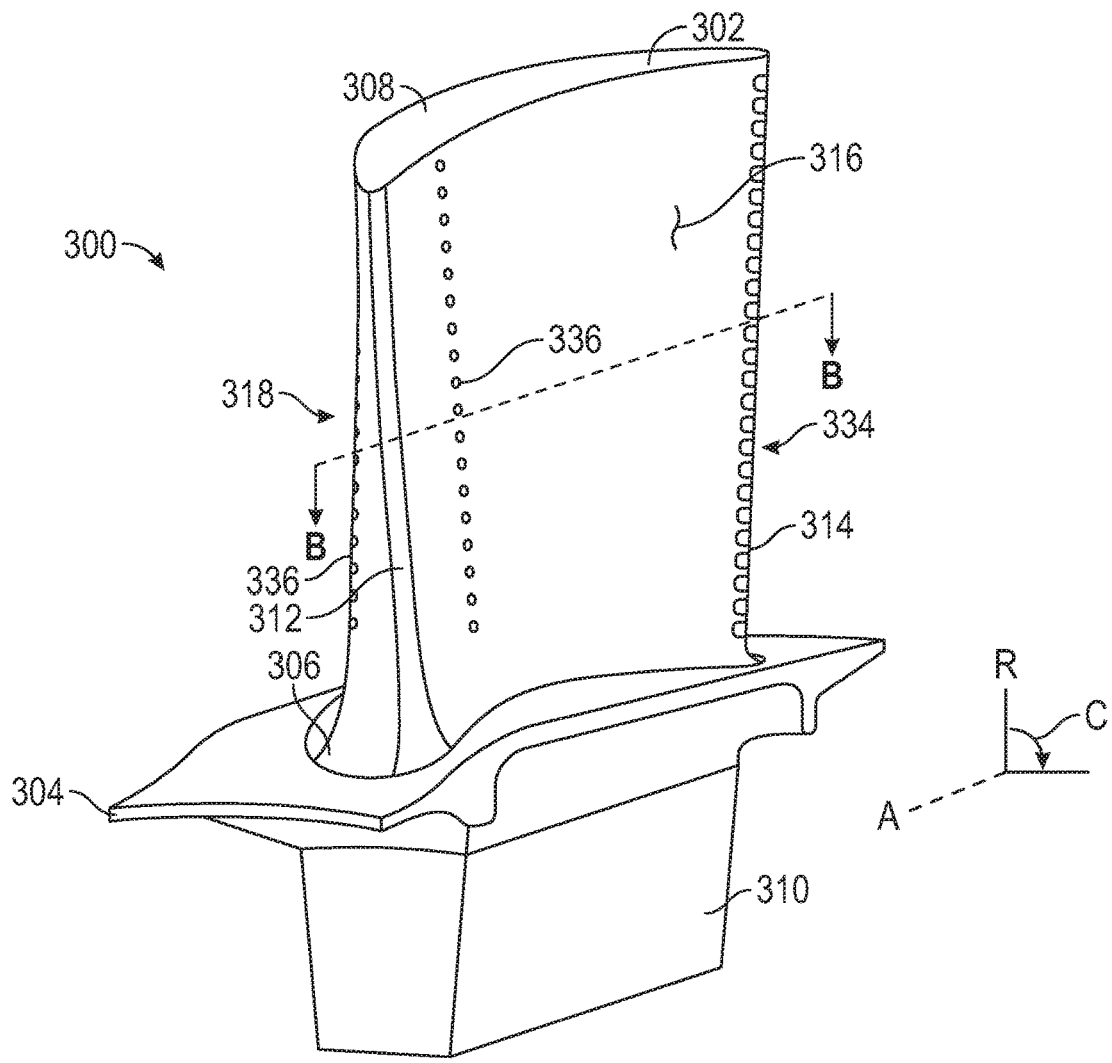
FIG. 3A is a perspective view of an airfoil that can incorporate embodiments of the present disclosure.
Figure 3B:
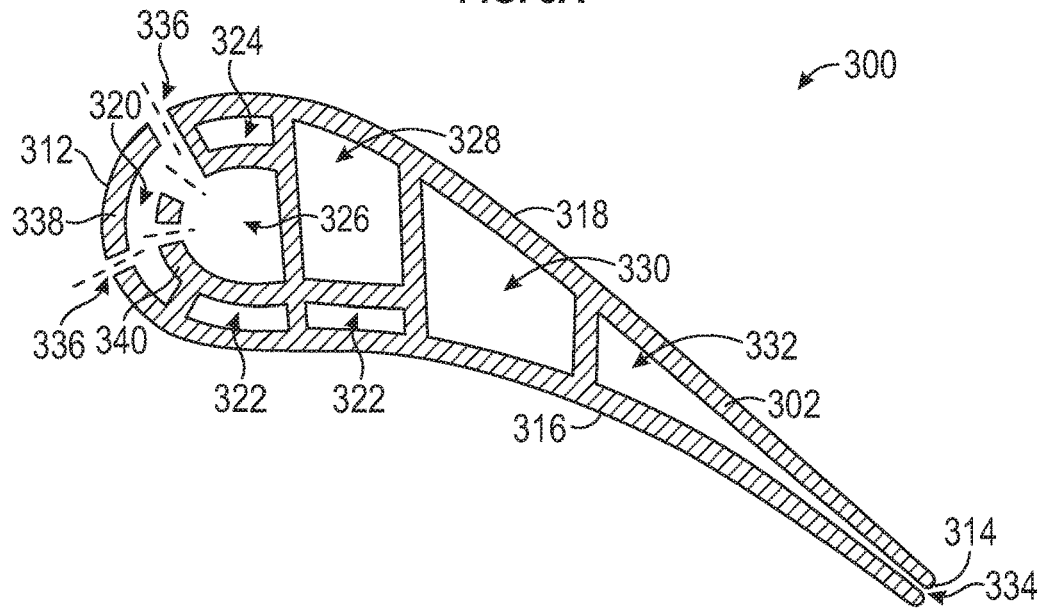
FIG. 3B is a partial cross-sectional view of the airfoil of FIG. 3A as viewed along the line B-B shown in FIG. 3A.

For example, turning now to FIGS. 3A-3B, schematic illustrations of an airfoil 300 are shown. FIG. 3A is an isometric illustration of the airfoil 300. FIG. 3B is a cross-sectional illustration of the airfoil 300 as viewed along the line B-B shown in FIG. 3A. The airfoil 300, as shown, is arranged as a blade having an airfoil body 302 that extends from a platform 304 from a root 306 to a tip 308. The platform 304 may be integrally formed with or attached to an attachment element 310, the attachment element 310 being configured to attach to or engage with a rotor disc for installation of the airfoil body 302 thereto. The airfoil body 302 extends in an axial direction A from a leading edge 312 to a trailing edge 314, and in a radial direction R from the root 306 to the tip 308. In the circumferential direction C, the airfoil body 302 extends between a pressure side 316 and a suction side 318.

As shown in FIG. 3B, illustrating a cross-sectional view of the airfoil 300, as viewed along the line B-B shown in FIG. 3A, the airfoil body 302 defines or includes a plurality of internal cavities to enable cooling of the airfoil 300. For example, as shown, the airfoil 300 includes a plurality of forward and side cooling cavities 320, 322, 324. A leading edge cavity 320 is located along the leading edge 312 of the airfoil body 302, pressure side cavities 322 are arranged along the pressure side 316 and proximate the leading edge 312, and a suction side cavity 324 is arranged along the suction side 318 and proximate the leading edge 312. In the relative middle of the airfoil body 302, the airfoil 300 includes various main body cavities 326, 328, 330, 332 and, at the trailing edge 314, a trailing edge slot 334. Some of the main body cavities may form a serpentine flow path through the airfoil 300, (e.g., cavities 328, 330, 332). Further, one or more of the main body cavities may be arranged to provide cool impinging air into the forward and side cooling cavities 320, 322, 324 (e.g., cavity 326). In some embodiments described herein, the cavity 326 may be referred to as a leading edge feed cavity. Although shown with a specific internal cooling cavity arrangement, airfoils in accordance with the present disclosure may include additional and/or alternative cavities, flow paths, channels, etc. as will be appreciated by those of skill in the art, including, but not limited to, tip cavities, serpentine cavities, trailing edge cavities, etc.

Air that impinges into the leading edge cavity 320 (or other forward and side cooling cavities 320, 322, 324) may be expunged onto a hot external surface of the airfoil 300 through one or more film cooling holes 336. During manufacturing of the airfoil 300, the film cooling holes 336 may be drilled into or through the external surfaces of the airfoil body 302. With reference to FIG. 3B, skin core cavities are defined between an external hot wall 338 and an internal cold wall 340 of the airfoil body 302. In accordance with embodiments of the present disclosure, the skin core cavities may have very thin heights, e.g., on the order of about 0.015 to 0.050 inches, with the height being a distance between a hot wall and a cold wall. Cool air from the leading edge feed cavity 326 may pass through impingement holes in the internal cold wall 340 to impinge upon the external hot wall 338, with the air subsequently flowing out through the film cooling holes 336.

The skin core cavities described above may be very efficient at cooling the hot wall of the airfoil, however such efficiencies must be appropriately managed to ensure robust parts and to minimize or reduce impacts on part life. For example, skin core cavity have a capacity for high heat transfer and thus it is possible to pick up too much heat and lose the ability to properly cool areas toward the end of the skin core (e.g., the air at the downstream end may have heated too much to effectively cool the downstream ends of the cavity). To alleviate this issue, a cavities of the present disclosure are arranged to allow for additional (e.g., a second) cavities that have been shielded from heat transfer at the upstream locations, and then transitions to cool the downstream locations. The shielded cavity will provide a large benefit in cooling effectiveness as the shielded cavity will contain cooling air that is still low in temperature.

Figure 4A:
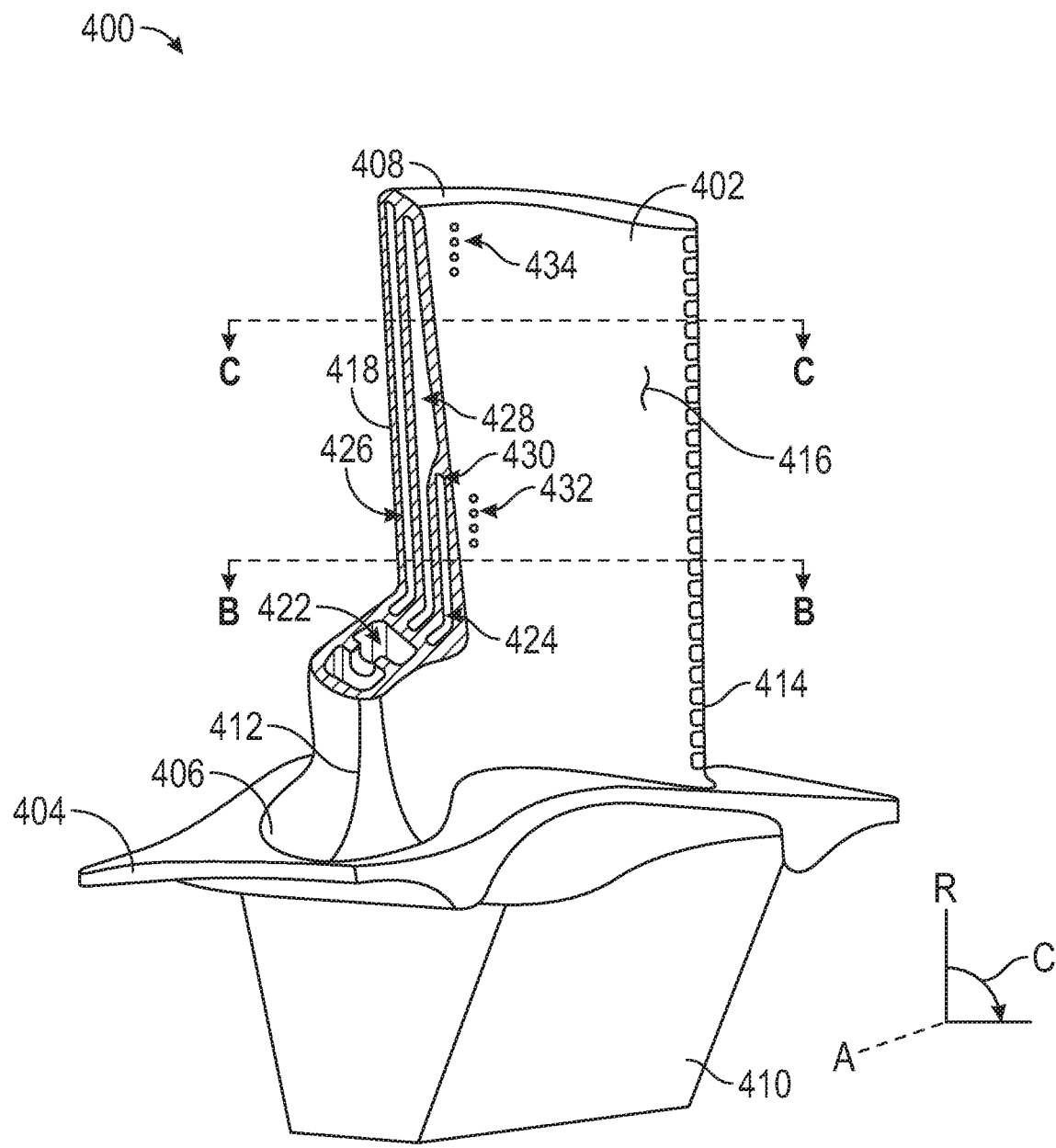
FIG. 4A is a schematic isometric illustration of an airfoil in accordance with an embodiment of the present disclosure.
Figure 4B:
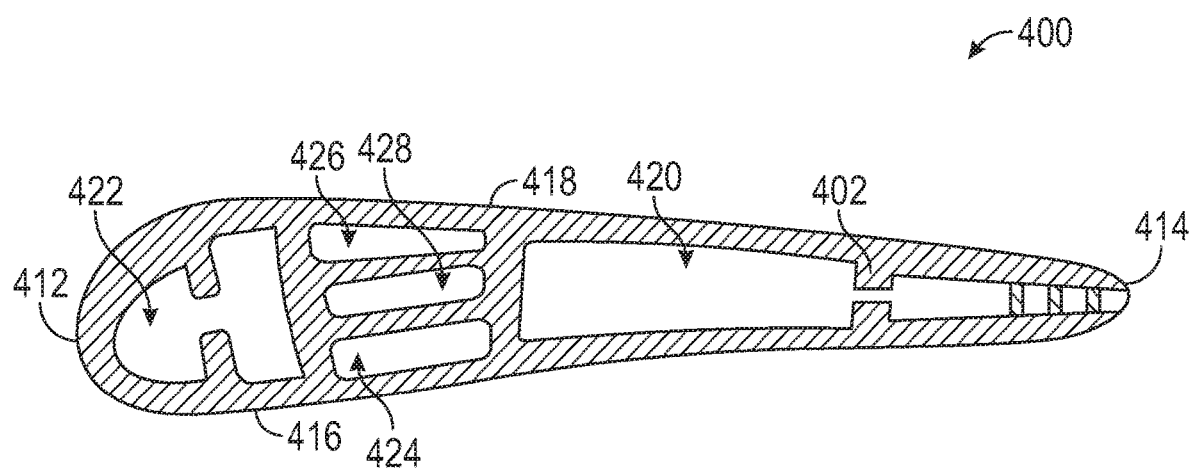
FIG. 4B is a cross-sectional illustration of the airfoil of FIG. 4A as viewed along the line B-B shown in FIG. 4A.
Figure 4C:
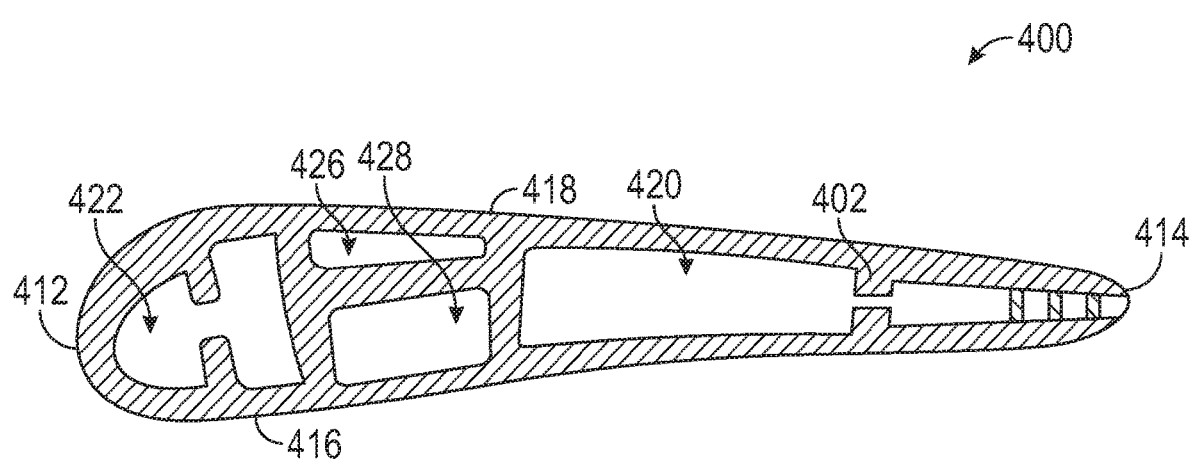
FIG. 4C is a cross-sectional illustration of the airfoil FIG. 4A as viewed along the line C-C shown in FIG. 4A.

For example, turning now to FIGS. 4A-4C, schematic illustrations of an airfoil 400 in accordance with an embodiment of the present disclosure are shown. FIG. 4A is an isometric illustration of the airfoil 400. FIG. 4B is a cross-sectional illustration of the airfoil 400 as viewed along the line B-B shown in FIG. 4A. FIG. 4C is a cross-sectional illustration of the airfoil 400 as viewed along the line C-C shown in FIG. 4A.

The airfoil 400, as shown, is arranged as a blade having an airfoil body 402 that extends from a platform 404. The airfoil body 402 attaches to or is connected to the platform 404 at a root 406 (i.e., inner diameter) and extends radially outward to a tip 408 (i.e., outer diameter). The platform 404 may be integrally formed with or attached to an attachment element 410 and/or the airfoil body 402, the attachment element 410 being configured to attach to or engage with a rotor disc for installation of the airfoil 400 to the rotor disc. The airfoil body 402 extends in an axial direction A from a leading edge 412 to a trailing edge 414, and in a radial direction R from the root 406 to the tip 408. In the circumferential direction C, the airfoil body 402 extends between a pressure side 416 and a suction side 418.

The airfoil body 402 defines a number of internal cooling cavities. For example, as shown in FIGS. 4A-4C, a main body cavity 420 is arranged to cool portions of the airfoil body 402 aft of the leading edge 412, and in some embodiments may be a serpentine cavity. As shown, the main body cavity 420 extends to the trailing edge 414. At the leading edge 412 of the airfoil body 402, a leading edge cavity 422 is provided, which may include an impingement and film cooling arrangement, as will be appreciated by those of skill in the art.

Forward of the main body cavity 420 and aft of the leading edge cavity 422 is a cavity arrangement that is configured to provide improved cooling to the airfoil body 402 toward the tip 408. For example, as shown a first shielding sidewall cavity 424, a second shielding sidewall cavity 426, and a shielded sidewall cavity 428 are arranged within the airfoil body 402. The first shielding sidewall cavity 424 is arranged adjacent an external wall of the airfoil body 402, in this case the pressure side 416, proximate the root 406. Similarly, the second shielding sidewall cavity 426 is arranged adjacent an external wall of the airfoil body 402, in this case the suction side 418, proximate the root 406. The shielded sidewall cavity 428, proximate the root 406, is arranged within the airfoil body 402 between the first shielding sidewall cavity 424 and the second shielding sidewall cavity 426. That is, proximate the root, the shielded sidewall cavity 428 has no direct thermal contact with the exterior surfaces of the airfoil body 402. Thus, the shielded sidewall cavity 428, proximate the root 406, may not have substantial heat pick-up and air passing therethrough will remain relatively cool.

The first shielding sidewall cavity 424 begins at the root 406 and extends radially outward toward the tip 408. The first shielding sidewall cavity 424 stops or is truncated at a dead end 430 and thus does not span the airfoil body 402 from the root 406 to the tip 408. At the dead end 430 of the first shielding sidewall cavity 424, the shielded sidewall cavity 428 transitions from being separated from the pressure side 416 to being proximate the pressure side 416 of the airfoil body 402 and extends along the pressure side from the dead end 430 to the tip 408. The second shielding sidewall cavity 426, in this embodiment, extends radially outward from the root 406 to the tip 408 along the suction side 418 of the airfoil body 402.

As shown in FIGS. 4A-4C, the cross-sectional area of the shielded sidewall cavity 428 may change in area when transitioning from being shielded to being adjacent an external sidewall of the airfoil body 402. As shown in the embodiment of FIG. 4A, one or more first film holes 432 are arranged along the pressure side 416 and fluidly connect the first shielding sidewall cavity 424 to an exterior of the airfoil body 402. The first film holes 432 are arranged on the airfoil body 402 radially inward from the location of the dead end 430. One or more second film holes 434 are arranged along the pressure side 416 and fluidly connect the shielded sidewall cavity 428 to an exterior of the airfoil body 402. The second film holes 434 are arranged on the airfoil body 402 radially outward from the location of the dead end 430.

Although FIGS. 4A-4C illustrate a particular airfoil cavity arrangement, embodiments of the present disclosure are not so limited. For example, in some embodiments, the truncated shielding sidewall cavity may be located on the suction side of the airfoil, and a full span shielding sidewall cavity may be located on the pressure side. Further, in some embodiments, the illustratively truncated cavity may not truncate, as described further below. Moreover, in some embodiments, one or more of the sidewall cavities (or portions thereof) can include one or more heat transfer augmentation features. Heat transfer augmentation features can include, but are not limited to, turbulators, trip strips (including, but not limited to normal, skewed, segmented skewed, chevron, segmented chevron, W-shaped, and discrete W's), pin fins, hemispherical bumps and/or dimples, as well as non-hemispherical shaped bumps and/or dimples, etc.

Figure 5:
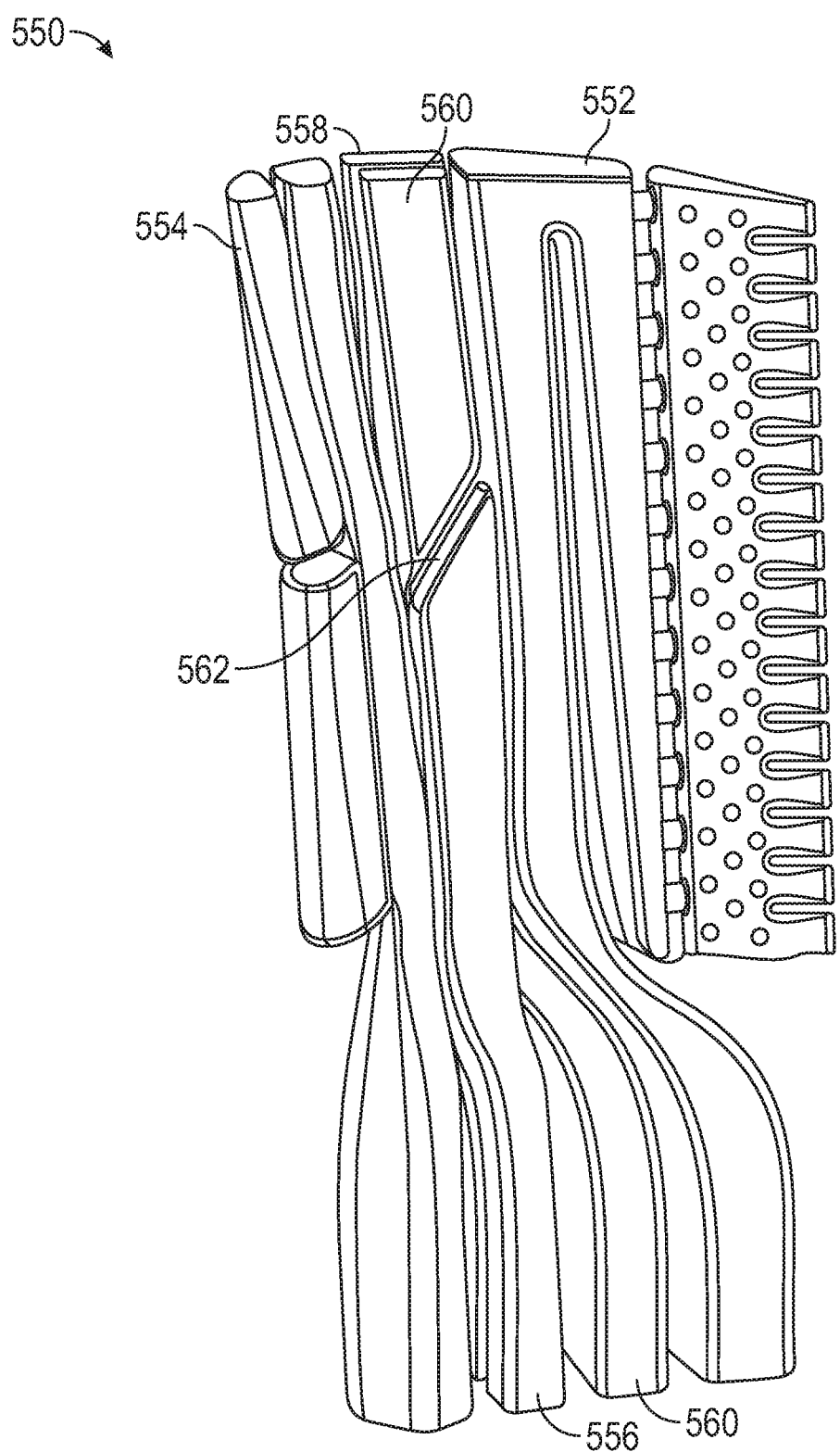
FIG. 5 is a schematic illustration of a core assembly for forming an airfoil in accordance with an embodiment of the present disclosure.

Turning now to FIG. 5, a schematic illustration of a core assembly 550 in accordance with an embodiment of the present disclosure is shown. The core assembly 550 may be used to form and manufacture airfoils in accordance with the present disclosure. The core assembly 550 includes a main body cavity core 552, a leading edge cavity core 554, and a plurality of sidewall cavity cores 556, 558, 560. Although shown with a single or unitary main body cavity core 552, those of skill in the art will appreciate that the main body cavities may be formed by one or more cores having various arrangements and geometries, without departing from the scope of the present disclosure. The formed airfoil, using the core assembly 550 of FIG. 5, may be substantially similar to the airfoil 400 shown in FIGS. 4A-4C.

The sidewall cavity cores 556, 558, 560 are arranged between the main body cavity core 552 and the leading edge cavity core 554. A first sidewall cavity core 556 is arranged to form a cavity along a pressure side of a formed airfoil, such as shown and described above. The first sidewall cavity core 556 does not extend a full length of the formed airfoil, but rather ends at a core end 562 that is located at a radial position between a formed root and a formed tip of the formed airfoil. The first sidewall cavity core 556 may form a first shielding sidewall cavity in the formed airfoil, similar to that shown and described above.

A second sidewall cavity core 558 is arranged as a full-length or full-span core that extends along a formed suction side and radially extends from a formed root to a formed tip of the airfoil. The second sidewall cavity core 558 may form a second shielding sidewall cavity in the formed airfoil, similar to that shown and described above.

A third sidewall cavity core 560 is arranged as a full-length or full-span core that is arranged between the first and second sidewall cavity core 556, 558 at a root portion of the formed airfoil and then transitions to a sidewall position above the core end 562 of the first sidewall cavity core 556.

Figure 6:
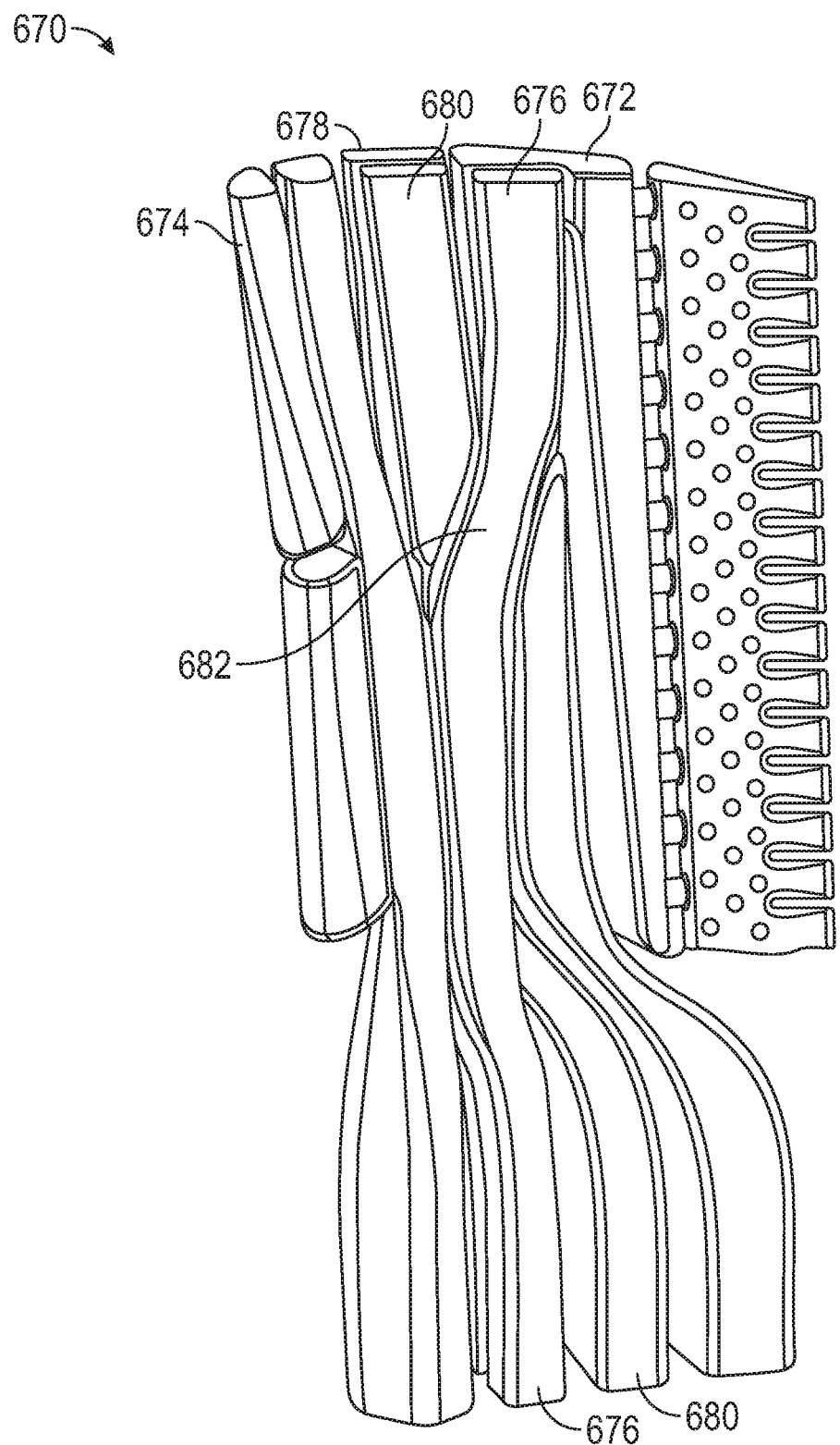
FIG. 6 is a schematic illustration of a core assembly for forming an airfoil in accordance with an embodiment of the present disclosure.

As noted above, in some embodiments, a dead end may not be required. For example, turning now to FIG. 6, a schematic illustration of a core assembly 670 in accordance with an embodiment of the present disclosure is shown. The core assembly 670 may be used to form and manufacture airfoils in accordance with the present disclosure. The core assembly 670 includes a main body cavity core 672, a leading edge cavity core 674, and a plurality of sidewall cavity cores 676, 678, 680. Although shown with a single or unitary main body cavity core 672, those of skill in the art will appreciate that the main body cavities may be formed by one or more cores having various arrangements and geometries, without departing from the scope of the present disclosure.

The sidewall cavity cores 676, 678, 680 are arranged between the main body cavity core 672 and the leading edge cavity core 674. A first sidewall cavity core 676 is arranged to form a cavity along a pressure side of a formed airfoil, such as shown and described above. In this embodiment, however, the first sidewall cavity core 676 extends a full length of the formed airfoil, but shifts or transitions aftward along a sidewall of the formed airfoil and extends adjacent a portion of the main body cavity core 672. The first sidewall cavity core 676 shifts aftward at a transition portion 682. The first sidewall cavity core 676 may form a first shielding sidewall cavity in the formed airfoil.

A second sidewall cavity core 678 is arranged as a full-length or full-span core that extends along a formed suction side and radially extends from a formed root to a formed tip of the airfoil. The second sidewall cavity core 678 may form a second shielding sidewall cavity in the formed airfoil, similar to that shown and described above.

A third sidewall cavity core 680 is arranged as a full-length or full-span core that is arranged between the first and second sidewall cavity core 676, 678 at a root portion of the formed airfoil and then transitions to a sidewall position above the transition portion 682 of the first sidewall cavity core 556. The third sidewall cavity core 680 transitions toward a side wall of a formed airfoil radially outward from the transition portion 682 of first sidewall cavity core 676.

As shown, where the first sidewall cavity core 676 transitions aftward, the first sidewall cavity core 676 interferes with the structure of the main body cavity core 672. Accordingly, the geometry of the main body cavity core 672, and the cavities formed thereby, are adjusted to accommodate the geometry of the first sidewall cavity core 676 (and cavity formed thereby).

Advantageously, embodiments described herein incorporate radially flowing cores/cavities that are used to cool an inner diameter and middle portion of an airfoil, with a shielded core/cavity arranged to provide cooling at outer diameter portions of the airfoil. In some embodiments, a shielding sidewall cavity (or core) may dead end, enabling a shielded cavity/core to transition to run adjacent a sidewall, or the shielding sidewall cavity (or core) may transition axially such that the shielded cavity (core) can continue to cool the area radially outboard of the first cavity (core). The shielded sidewall cavity will be able to cool the outer diameter portions of the airfoil efficiently because the cooling air therein has been shielded from heat transfer radially inward from the tip region. Advantageously, embodiments provided herein can enable improved part life and thrust specific fuel consumption.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
   an airfoil body extending between a leading edge and a trailing edge in an axial direction, between a pressure side and a suction side in a circumferential direction, and between a root and a tip in a radial direction;
   a first shielding sidewall cavity located adjacent one of the pressure side and the suction side proximate the root of the airfoil body and extending radially toward the tip;
   a second shielding sidewall cavity located adjacent the other of the pressure side and the suction side proximate the root of the airfoil body and extending radially toward the tip;
   a shielded sidewall cavity located between the first shielding sidewall cavity and the second shielding sidewall cavity; and
   a main body cavity arranged aft of the first shielding sidewall cavity, the second shielding sidewall cavity, and the shielded sidewall cavity, wherein the main body cavity extends to the trailing edge of the airfoil body, wherein the shielded sidewall cavity is not adjacent either of the pressure side or the suction side proximate the root, such that the shielded sidewall cavity has no direct thermal contact with an exterior surface of the airfoil body, and transitions to be proximate at least one of the pressure side and the suction side at a transition portion of the first shielding sidewall cavity, such that the shielded sidewall cavity has direct thermal contact with an exterior surface of the airfoil body proximate the tip.

2. The airfoil of claim 1, wherein the first shielding sidewall cavity is positioned along the pressure side and the second shielding sidewall cavity is positioned along the suction side of the airfoil body.

3. The airfoil of claim 1, wherein the second shielding sidewall cavity extends from the root to the tip of the airfoil body.

4. The airfoil of claim 1, wherein the first shielding sidewall cavity is a radially truncated cavity having a dead end at the transition portion such that the first shielding sidewall cavity does not span the airfoil body from the root to the tip.

5. The airfoil of claim 4, wherein the shielded sidewall cavity transitions toward the pressure or suction side radially outward from the dead end above the first shielding sidewall cavity.

6. The airfoil of claim 1, wherein the first shielding sidewall cavity transitions aftward at the transition portion and extends from the root to the tip such that the first shielding sidewall cavity runs adjacent a portion of the main body cavity along an exterior surface of the airfoil body, and the portion of the main body cavity is forward of the first shielding sidewall cavity proximate the tip.

7. The airfoil of claim 6, wherein the shielded sidewall cavity transitions toward the pressure or suction side radially outward from the transition portion.

8. The airfoil of claim 1, further comprising one or more first film holes fluidly connecting the first shielding sidewall cavity to an exterior of the airfoil body and one or more second film holes fluidly connecting the shielded sidewall cavity to the exterior of the airfoil body.

9. The airfoil of claim 1, wherein the main body cavity is a serpentine cavity.

10. The airfoil of claim 1, wherein the first shielding sidewall cavity transitions to shield a portion of the main body cavity proximate the tip radially outward from the transition portion.

11. The airfoil of claim 1, further comprising a leading edge cavity forward of the first shielding sidewall cavity and proximate the leading edge of the airfoil body.

12. A core assembly for forming an airfoil of a gas turbine engine, the core assembly comprising:
   a first sidewall cavity core arranged to form an internal cavity of a formed airfoil, the first sidewall cavity core positioned to be adjacent one of a suction side and a pressure side of the formed airfoil at a root of the formed airfoil;
   a second sidewall cavity core arranged to form an internal cavity of the formed airfoil, the second sidewall cavity core positioned to be adjacent the other of the suction side and the pressure side of the formed airfoil at the root of the formed airfoil;
   a third sidewall cavity core arranged to form an internal cavity of the formed airfoil, the third sidewall cavity core positioned between the first sidewall cavity core and the second sidewall cavity core at a root of the formed airfoil and transitions to be proximate at least one of the pressure side and the suction side proximate a tip of the formed airfoil, wherein a shielded sidewall cavity is formed by the third sidewall cavity core in the formed airfoil; and a main body cavity core arranged aft of the first shielding sidewall cavity core, the second shielding sidewall cavity core, and the third sidewall cavity core, wherein the main body cavity core extends to a trailing edge of the formed airfoil body, wherein the formed shielded sidewall cavity is not adjacent either of the pressure side or the suction side proximate the root, such that the shielded sidewall cavity has no direct thermal contact with an exterior surface of the formed airfoil body, and transitions to be proximate at least one of the pressure side and the suction side at a transition portion of the first shielding sidewall cavity, such that the shielded sidewall cavity has direct thermal contact with an exterior surface of the formed airfoil body proximate the tip.

13. The core assembly of claim 12, wherein the first sidewall cavity core is positioned along the formed pressure side and the second sidewall cavity core is positioned along the formed suction side.

14. The core assembly of claim 12, wherein the first sidewall cavity core is a truncated core at the transition portion having a core end located between a formed root and formed tip of the formed airfoil.

15. The core assembly of claim 14, wherein the third sidewall cavity core transitions toward the formed pressure or suction side radially outward from the core end.

16. The core assembly of claim 12, wherein the first sidewall cavity core transitions aftward along the transition portion and extends from the formed root to the formed tip of the formed airfoil such that a formed first shielding sidewall cavity runs adjacent a portion of a formed main body cavity along an exterior surface of the formed airfoil body, and the portion of the main body cavity is forward of the first shielding sidewall cavity proximate the tip.

17. The core assembly of claim 12, wherein the main body cavity core defines a serpentine flow path in the formed airfoil.

18. The core assembly of claim 12, wherein the first sidewall cavity core transitions to shield a portion of the main body cavity core proximate the formed tip radially outward from the transition portion.

19. The core assembly of claim 12, further comprising a leading edge cavity core forward of the first sidewall cavity core and proximate a leading edge of the formed airfoil.

20. A gas turbine engine comprising:

a turbine section having a plurality of airfoils, wherein at least one airfoil comprises:

an airfoil body extending between a leading edge and a trailing edge in an axial direction, between a pressure side and a suction side in a circumferential direction, and between a root and a tip in a radial direction;

a first shielding sidewall cavity located adjacent one of the pressure side and the suction side proximate the root of the airfoil body and extending radially toward the tip;

a second shielding sidewall cavity located adjacent the other of the pressure side and the suction side proximate the root of the airfoil body and extending radially toward the tip;

a shielded sidewall cavity located between the first shielding sidewall cavity and the second shielding sidewall cavity; and a main body cavity arranged aft of the first shielding sidewall cavity, the second shielding sidewall cavity, and the shielded sidewall cavity, wherein the main body cavity extends to the trailing edge of the airfoil body, wherein the shielded sidewall cavity is not adjacent either of the pressure side or the suction side proximate the root, such that the shielded sidewall cavity has no direct thermal contact with an exterior surface of the airfoil body, and transitions to be proximate at least one of the pressure side and the suction side at a transition portion of the first shielding sidewall cavity, such that the shielded sidewall cavity has direct thermal contact with an exterior surface of the airfoil body proximate the tip.

* * * * *